United States Patent [19]

Ohta et al.

[11] Patent Number: 4,925,776
[45] Date of Patent: May 15, 1990

[54] OPTICAL MEMORY ELEMENT AND MANUFACTURING METHOD THEREOF

[75] Inventors: Kenji Ohta, Nara; Junji Hirokane, Tenri; Akira Takahashi; Tetsuya Inui, both of Nara; Shohichi Katoh, Yamatokoriyama; Toshihisa Deguchi, Nara, all of Japan

[73] Assignee: Sharp Kabushiki Kaisha, Osaka, Japan

[21] Appl. No.: 229,753

[22] Filed: Aug. 8, 1988

Related U.S. Application Data

[63] Continuation of Ser. No. 901,132, Aug. 28, 1986, abandoned.

[30] Foreign Application Priority Data

Aug. 30, 1985 [JP] Japan .................. 60-192937
Sep. 19, 1985 [JP] Japan .................. 60-207864
Sep. 26, 1985 [JP] Japan .................. 60-215909

[51] Int. Cl.$^5$ .............................. G03C 5/16
[52] U.S. Cl. .................................... 430/321; 430/5; 430/22; 430/323; 430/935
[58] Field of Search ............ 430/5, 22, 321, 323, 430/324, 935, 945, 329; 427/240

[56] References Cited

U.S. PATENT DOCUMENTS

| 3,824,014 | 7/1974 | Abita | 355/75 |
| 3,936,301 | 2/1976 | Schneider | 430/5 |
| 4,111,698 | 9/1978 | Sato | 430/496 |
| 4,150,398 | 4/1979 | Kojima et al. | 358/128 |
| 4,423,137 | 12/1983 | Rester | 430/320 |
| 4,544,443 | 10/1985 | Ohta et al. | 156/643 |
| 4,555,471 | 11/1985 | Barzynski et al. | 430/273 |
| 4,634,617 | 1/1987 | Ohta et al. | 428/65 |
| 4,655,876 | 4/1987 | Kawai et al. | 156/643 |
| 4,658,393 | 4/1987 | Ohta et al. | 369/290 |

FOREIGN PATENT DOCUMENTS

| 0155000 | 3/1985 | European Pat. Off. |
| 58-102795 | 6/1983 | Japan |
| 102235 | 6/1984 | Japan |
| 59-102235 | 6/1984 | Japan |

OTHER PUBLICATIONS

RD 17524, "A Method of Providing Close Contact for Contact Printing", Research Disclosure, No. 17524, Nov. 1978.

Primary Examiner—Jose G. Dees
Attorney, Agent, or Firm—Birch, Stewart, Kolasch & Birch

[57] ABSTRACT

A method for manufacturing an optical memory element including the steps of disposing a resist film on a substrate, placing a photo-mask carrying a guide groove pattern on the resist film so as to position the photo-mask over a predetermined position of the substrate, forming a guide groove pattern latent image on the resist film, developing the guide groove pattern latent image formed on the resist film, conducting an etching operation through the developed guide groove pattern as to form guide grooves in the substrate, removing the resist film from the substrate, and disposing a recording medium layer on the substrate having the guide grooves formed therein.

16 Claims, 9 Drawing Sheets

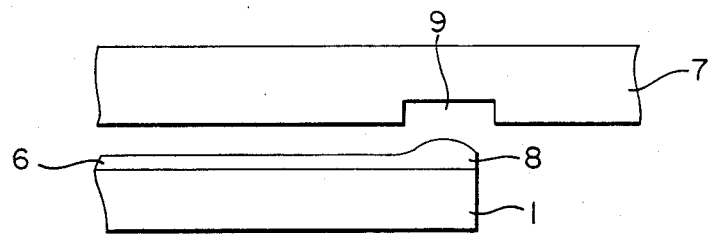
FIG. 8
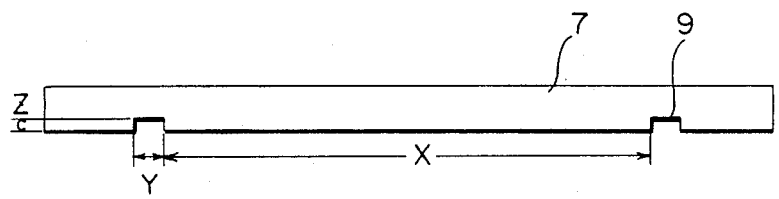
FIG. 9
    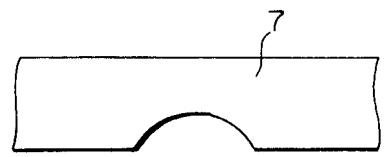
FIG. 10(a)     FIG. 10(b)

OPTICAL MEMORY ELEMENT AND MANUFACTURING METHOD THEREOF

This application is a continuation of application Ser. No. 06/901,132 filed on Aug. 28, 1986, now abandoned.

BACKGROUND OF THE INVENTION

The present invention relates to an optical memory element capable for at least one of the recording, reproducing and erasing operations by means of optical beam irradiation, or more specifically to an optical memory element substrate and a photo-mask for use in transcribing guide tracks and track address patterns onto an optical memory element substrate.

Of late, demand for optical memory elements is increasing year by year due to their high density and large capacity. Optical memory elements can be classified into the three types in terms of their use: read-only memory, add-on memory and erasable memory.

Optical memory elements ensure high density and large capacity because a bit (information recording unit), which is determined solely by optical beam diameter, can be made as small as about 1μm in size. This fact, however, causes a number of restrictions for an optical memory system; optical beam positioning must be extremely accurate in order to record information precisely in a predetermined point or reproduce proper information recorded in a preselected point. In the case of read-only type optical memory, in general, address data can be recorded together with data information so that it is possible to properly position the optical beam while recorded data information is being reproduced. For add-on memory or erasable memory type, on the other hand, it is difficult to record address data together with data information in the memory. Therefore, in the add-on memory or the erasable memory, guide signals or guide addresses are normally recorded on the memory substrate.

For instance, an optical memory element to be used as add-on or erasable memory normally has guide tracks in the substrate, to guide an information-recording or information-reproducing beam spot to a specified position on the optical memory element. In many cases, track address-indicating data is written in a part of each guide track to locate the guide track.

FIG. 1 shows the essential part of the memory substrate of the add-on or erasable memory type in perspective view. As shown, stripe-shaped grooves are formed in the substrate, and information is recorded or reproduced along the grooves. Though not shown, the grooves are intermittent in the circumferential direction so as to provide address bit information for each groove. In an optical memory element of a disc shape as shown in FIG. 2, in particular, guide track 3 and tracks address portion 2 (together with sector addresses if the tracks are divided into many sectors) are formed concentrically or spirally in the substrate 1. For the purpose of simplicity, only one track 3 and only one address portion 2 are shown in FIG. 2.

A number of methods have been practiced for manufacturing a disc substrate provided with tracks and addresses as described above. A mask which carries guide tracks and addresses thereon may be airtightly placed on a resist film applied on a glass disc, to form the tracks and addresses in form of grooves or pits directly on the glass disc. In this method, it is essential to form the guide tracks in such a manner that the guide track center coincides with the center hole of the glass disc as precisely as possible. With poor concentricity between the guide tracks and the glass disc, when the glass disc is rotated for recording, reproduction or erasing with the center hole fixed on a rotary shaft 4, as shown in FIG. 3, the guide tracks vibrate significantly with respect to a recording, reproducing or erasing laser beam 5, and hampering track servo operation for controlling the lens position. For the above reason, it is necessary to join the guide track center and the glass disc center hole as precisely as possible (with deviation allowance preferably within 20μm) in the optical exposure of the guide tracks.

The above manufacturing method can cause another problem in the guide track and track address pattern transcription process. The resist film 6, when applied, tends to have a partial rise 8 at the peripheral portion of the disc glass as shown in FIG. 4. This rise 8 often impairs close contact between the resist film 6 and the photo-mask 7, although it is desirable that they are made in close contact with each other. The width of this deficient close contact is usually 1–2mm. In FIG. 4, the guide track and address pattern on the photo mask 7 is omitted. The deficiency in close contact prevents the guide tracks and track addresses from being formed at proper positions.

SUMMARY OF THE INVENTION

In view of the foregoing, it is an object of the present invention to provide an optical memory element in which guide tracks and track addresses are accurately formed on the substrate of an optical memory element.

Another object of the invention is to provide a method for manufacturing an optical memory element, which method ensures accurate formation of guide tracks and track addresses.

Another object of the invention is to provide a mask which facilitates concentricity between the guide track center and the disc center hole when transcribing guide tracks and addresses on a resist film applied on the disc.

Still another object of the present invention is to provide a photo-mask which prevents deficient close contact between a resist film and the photo mask from being caused by a rise of the resist film on the peripheral portion of the disc glass.

Further objects of the present invention are to provide improvements in the configuration of glass substrates so as to achieve guide tracks and address-indicating grooves of more accurate shape.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, a method for manufacturing an optical memory element may be employed which includes the steps of disposing a resist film on a substrate, providing a photo-mask carrying a guide groove pattern on the resist film so as to position the photomask over a predetermined position of the substrate, forming a guide groove pattern latent image on the resist film, developing the guide groove pattern latent image formed on the resist film, conducting an etching operation through the developed guide groove pattern so as to form guide grooves in the substrate, removing the resist film from the substrate, and disposing a recording medium layer on the substrate having the guide grooves formed therein.

The substrate is disc shaped with a hole in its center. The photo-mask is provided with a marker of the shape corresponding to the center hole in disc substrate and a pattern corresponding to guide tracks to be formed on the substrate disc.

The photo-mask may be cut away at a position corresponding to the rise of the resist film.

The peripheral portion of the substrate may be ground to be inclined so that the plane of the substrate with the grooves formed therein is higher than the rise of the resist film which may occur on the peripheral portion of the substrate when the resist film is applied on the substrate.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 8 is a partially enlarged sectional view of another embodiment of an optical disc photo-mask of the present invention;

FIG. 9 is a sectional view showing the entire photo-mask of FIG. 8;

FIGS. 10 (a) and 10 (b) are partially enlarged sectional views showing other embodiments of an optical memory element photo-mask of the present invention;

DETAILED DESCRIPTION OF THE INVENTION

Figure 1:
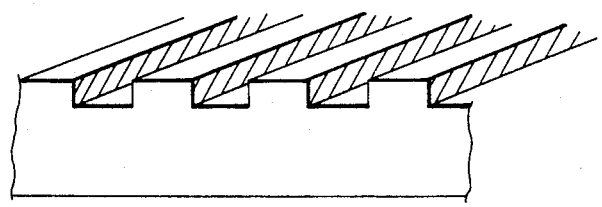
FIG. 1 is a perspective view of the essential part of a glass substrate of an add-on memory or erasable memory after grooves have been formed thereon.

An embodiment of an optical memory element of the present invention will be described in detail below with reference to the accompanying drawings.

FIG. 5 shows manufacturing steps of the substrate of the optical memory element of the present invention. Referring to FIG. 5, a manufacturing method of the optical memory element substrate is described by the following steps.

Step I

An optical memory element glass substrate which is highly reliable with respect to oxygen and moisture penetration (or which does not allow oxygen and moisture penetration) is cleaned. A photo resist film 6 is applied on the glass substrate 1 (See FIG. 5 (a)). The thickness of the photo resist film 6 is preferably about 100 nm–500 nm.

Step II

A mask plate 7 on which guide track and address information have been patterned is placed in an airtight manner over the photo resist film 6 on the glass substrate 1. Then, the mask plate 7 is irradiated with ultraviolet rays A to transcribe the mask pattern of the mask plate 7 onto the photo resist film 6 (See FIG. 5 (b)). Since the optical memory element is disc shaped, it is desirable that the mask plate 7 is round.

Step III

The photo resist film 6 with the mask pattern thereon is developed so as to form grooves in the resist film 6 (See FIG. 5 (c)).

Step IV

The glass substrate 1 covered with the photo resist film 6 having grooves formed therein is subjected to wet etching operation or dry etching operation such as sputtering (reactive ion etching) in an etching gas atmosphere such as $CF_4$ or $CHF_3$. Grooves 8 are then formed in the glass substrate 1 (See FIG. 5 (d)).

Step V

The developed resist film 6 is removed from the glass substrate 1 by means of sputtering in an $O_2$ atmosphere, or dissolving with a solvent such as acetone. In this way, the glass substrate 1 with the grooves 8 formed therein is produced (See FIG. 5 (e)).

Step VI

After the step V, a recording medium layer is formed on the glass substrate 1 having the grooves 8 formed therein.

The glass substrate 1 having grooves for guide tracks and guide address information is completed through the above process. According to this process, the mask plate 7 with the pattern for guide tracks and guide address information thereon, prepared in advance, is placed airtightly over the glass substrate 1 coated with the photo resist film 6, so as to transcribe the mask pattern of the mask plate 7. Therefore, the time required for transcribing the guide pattern can be substantially reduced.

The optical disc mask 7 used in the above manufacturing process is described as follow.

Figure 6:
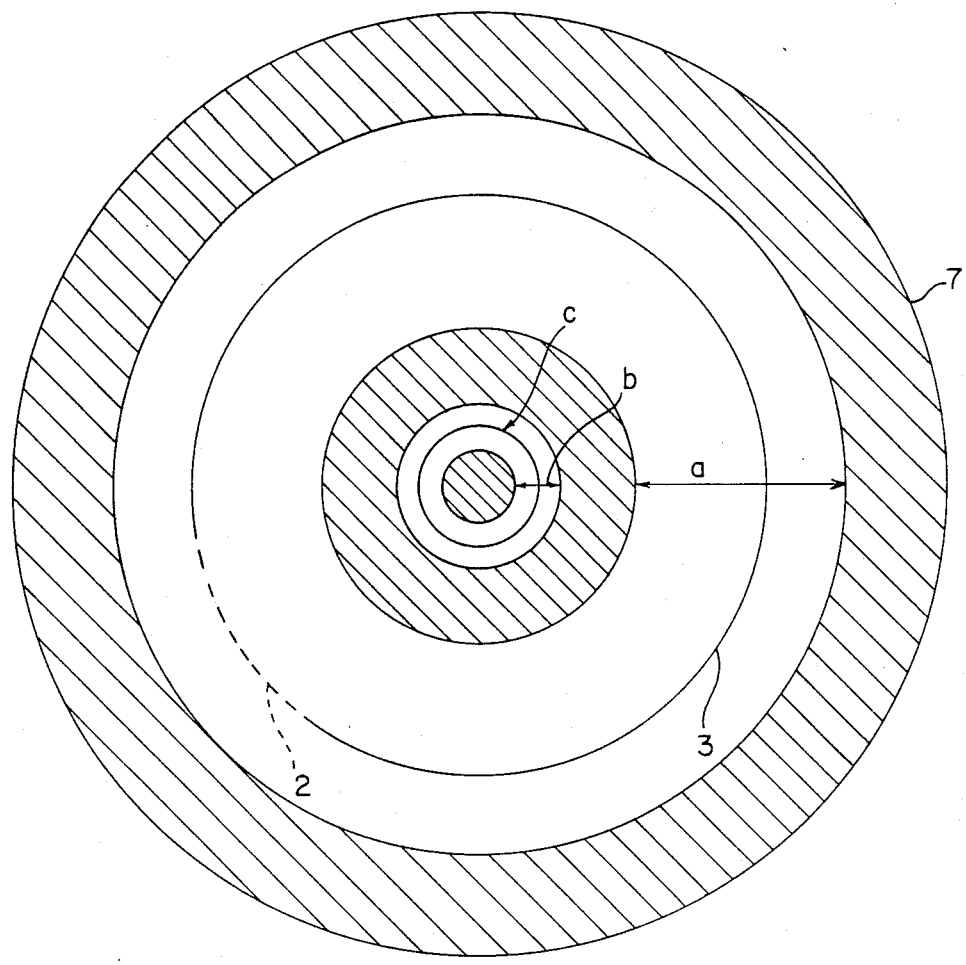
FIG. 6 is a plan view of an embodiment of an optical disc photo-mask of the present invention.

FIG. 6 is a plan view of an embodiment of an optical disc mask of the present invention. The mask 7 has been produced by forming Cr or CrO film over, for example, a quartz glass disc plate and etching the film to make the pattern shown in FIG. 6. Referring to FIG. 6, the shaded part indicates the area where Cr or CrO remains unremoved. The area "a" is an information area in a part of which are formed tracks 3 and addresses 2 spirally or concentrically. Cr or CrO is removed in the area "b" of the mask 7. A positioning reference marker C is provided in the area "b". The concentricity of the tracks can be secured by recording the reference marker C and the guide tracks simultaneously by using the same recording device. For example, when the marker C has virtually the same diameter as the glass disc center hole, the marker C can be easily adjusted to the disc center hole when placing the mask on the glass disc for pattern transcription, so that it is easy to achieve the concentricity of the tracks with respect to the disc.

Figure 7:
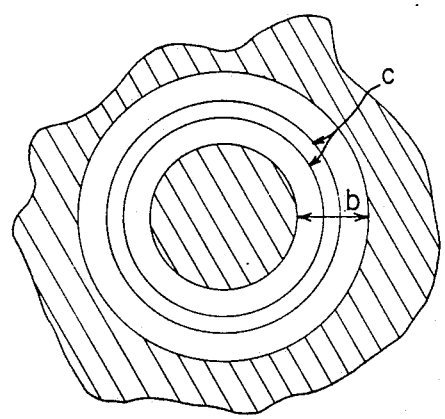
FIG. 7 is a plan view showing a part of another embodiment of an optical disc photo-mask of the present invention.
Figure 2:
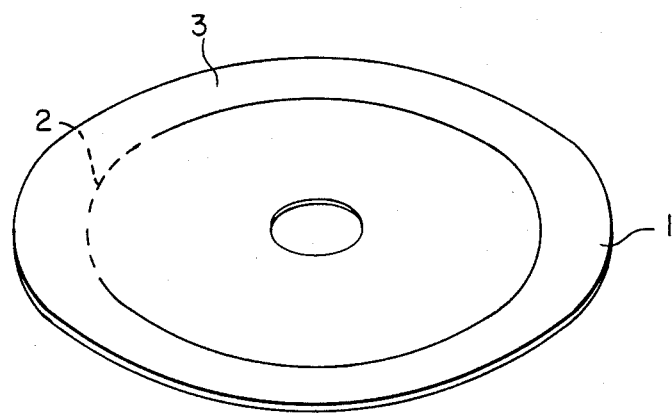
FIG. 2 is a prespective view of a typical optical memory element (optical disc)
Figure 3:
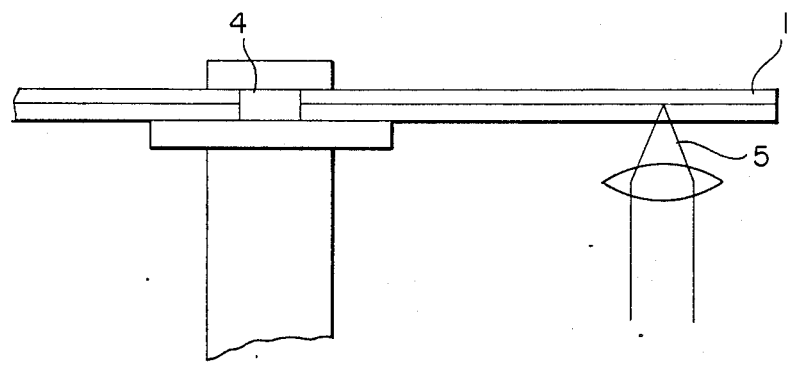
FIG. 3 is a sectional view showing a part of the optical disc system.
Figure 4:
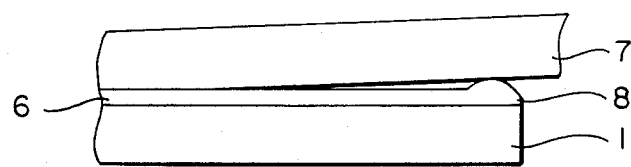
FIG. 4 is a sectional view showing the contact between the glass substrate and the photo-mask of a conventional optical memory element.

The marker need not be limited to the above embodiment. As shown in FIG. 7, two markers C may be recorded at an interval of about 10–20μm and with such diameters that the glass disc center hole is positioned between the two markers. Assuming the glass disc center hole is about 15 mm in diameter, for instance, the two markers may have the diameters of about 14.09 mm and 15.01 mm, respectively. With such markers, it is easy to position the mask with respect to the glass disc center hole. Generally, the center hole of a glass disc has a high degree of roundness but often differs in the diameter, for instance within the range of about 15±0.5 mm, depending upon the manufacturing process. To provide for various center hole diameters of the disc, a plurality of markers C with different diameters may be formed concentrically on a mask so that the same mask can be used for discs with different center hole diameters. Alternatively, instead of using the marker C of FIG. 6, it is possible to use the area "b" as a marker if the area "b" is made smaller. In the above embodiment, Cr or CrO is used in the shaded area of FIG. 6. Other metal films such as Ni, Ti or Ta may be used in place of Cr or CrO.

As understood from the above, by using the mask of the present invention, it is possible to improve the concentricity of the memory disc guide tracks with the memory disc center hole, thus minimizing vibration of the guide tracks with respect to the optical beam in recording, reproducing or erasing information on the disc. Consequently, servo operation of an objective lens for condensing a laser beam becomes easier.

Another embodiment of a mask 7 used in the manufacturing method of the present invention is described as follows.

FIG. 8 is a partially enlarged sectional view of another embodiment of an optical memory element photo mask of the present invention. As shown, a groove 9 is formed in the photo-mask 7 at the position facing the peripheral portion of the glass disc 1, to accommodate the rise 8 of the resist film 6, thus eliminating deficient close contact between the glass disc 1 and the photo-mask 7.

Figure 11:
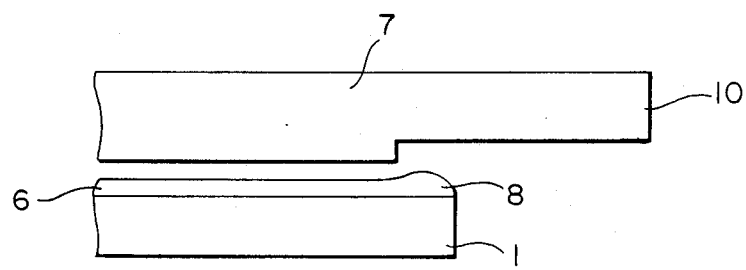
FIG. 11 is also a partially enlarged sectional view showing still another embodiment of an optical memory element photo-mask of the present invention.
Figure 5A:
FIG. 5 is a sectional view for illustrating manufacturing steps of an optical memory element of the present invention.
Figure 5B:
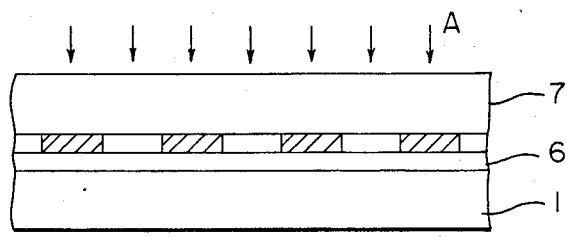
Figure 5C:
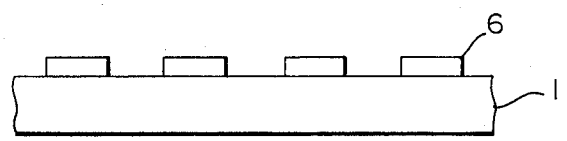
Figure 5D:
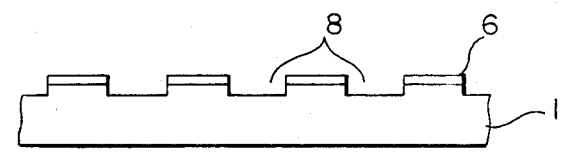
Figure 5E:
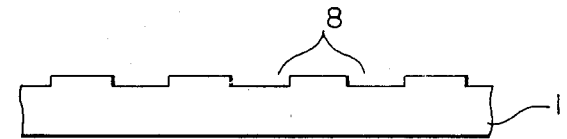

For the glass disc of about 130±0.1 mm in diameter, for instance, the groove desirably has the width "Y" (about 4 mm for example) with the inside diameter of a circle defined by the groove being "X" (127 mm for example) as shown in FIG. 9. The depth "Z" of the groove should be about 0.2–0.5 mm. The section of the groove is not necessarily square as shown in FIG. 9. It may be triangular as shown in FIG. 10 (a) or semi-circular as shown in FIG. 10 (b). In short, the groove provided in the photo mask may be of any shape as long as it can absorb the rise 8 of the resist film 6 on the periphery of the glass disc 1. In this sense, instead of forming a groove, the peripheral portion 10 of the photo-mask 7 may be made thinner than the central portion as shown in FIG. 11, to absorb the rise 8 of the resist film 6.

By using the photo-mask of the present invention, the guide track and track address pattern for an optical memory element can be properly transcribed onto the resist film applied on the optical memory element substrate.

The shape of the section of the glass disc substrate is described with reference to the drawings as follows.

Figure 12A:
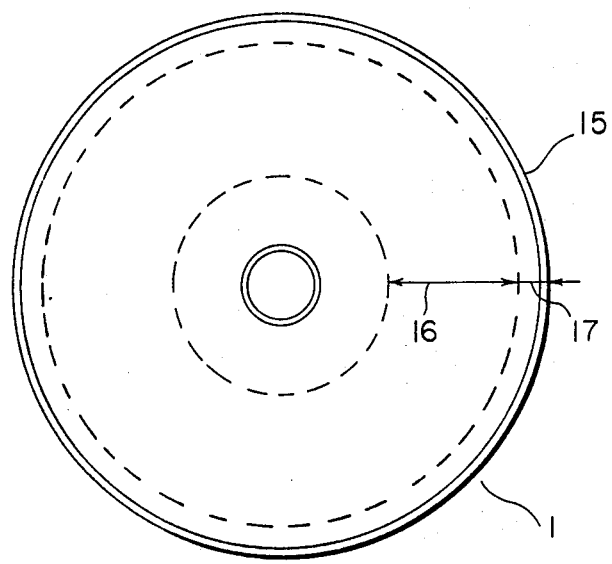
FIGS. 12 (a) and 12 (b) are plan views and a sectional view, respectively, of the glass substrate for an optical memory element.
Figure 12B:
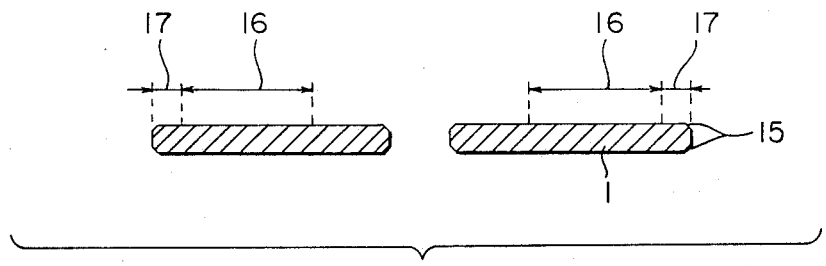

FIG. 12 (a) is a plan view of the glass disc substrate 1 and FIG. 12 (b) is a sectional view of the glass disc substrate 1. The outer edges 15 of the glass disc substrate 1 are chamfered, as shown.

Figure 13A:
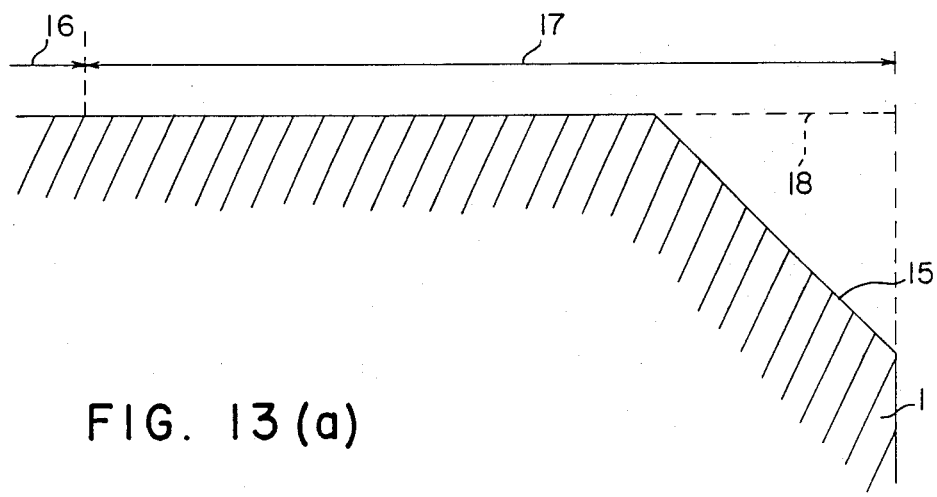
FIGS. 13 (a), 13 (b) and 13 (c) are partially enlarged sectional views of glass substrates for an optical memory element of the present invention.
Figure 13B:
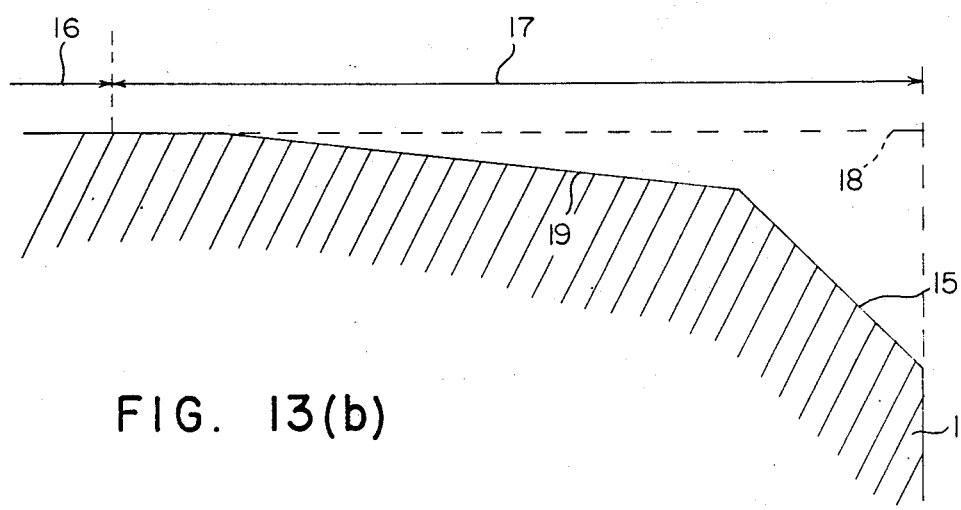
Figure 13C:
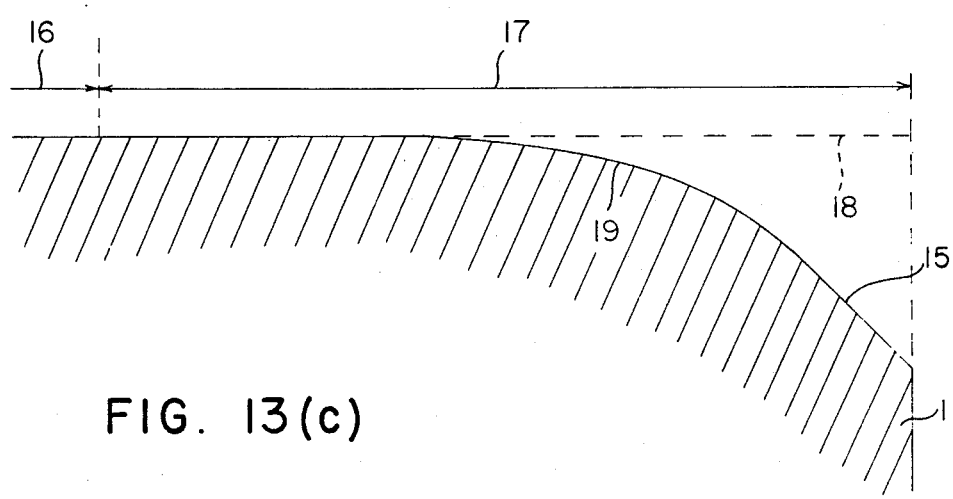

FIG. 13 is an enlarged sectional view of the chamfered edge 15. FIG. 13 (a) is a sectional view of the chamfered edge of a conventional glass disc substrate, and FIGS. 13 (b) and 13 (c) are sectional views showing the chamfered edge configuration of the glass disc substrate of the present invention. In both of FIGS. 13 (b) and 13 (c), the surface portion 17 without guide grooves is ground to be lower than the glass disc substrate surface plane 18.

Figure 14A:
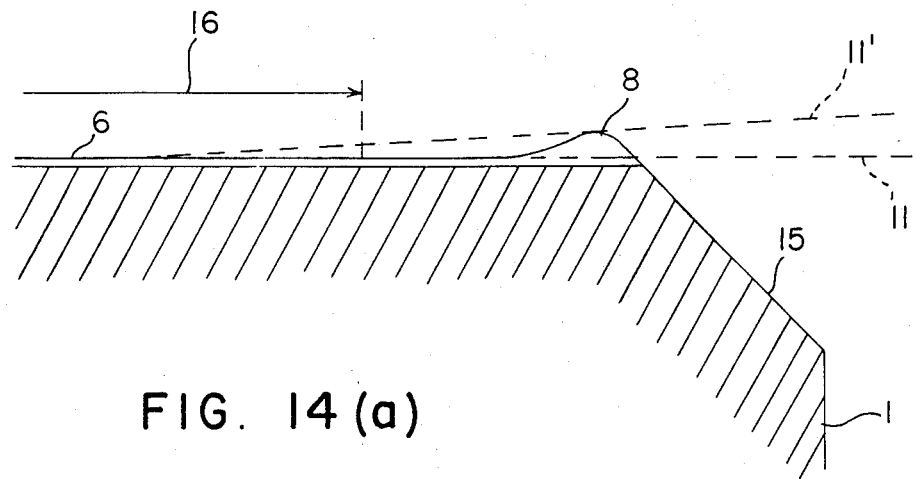
FIGS. 14 (a), 14 (b) and 14 (c) are partially enlarged sectional views of the optical memory element glass substrates on which resist film is applied.
Figure 14B:
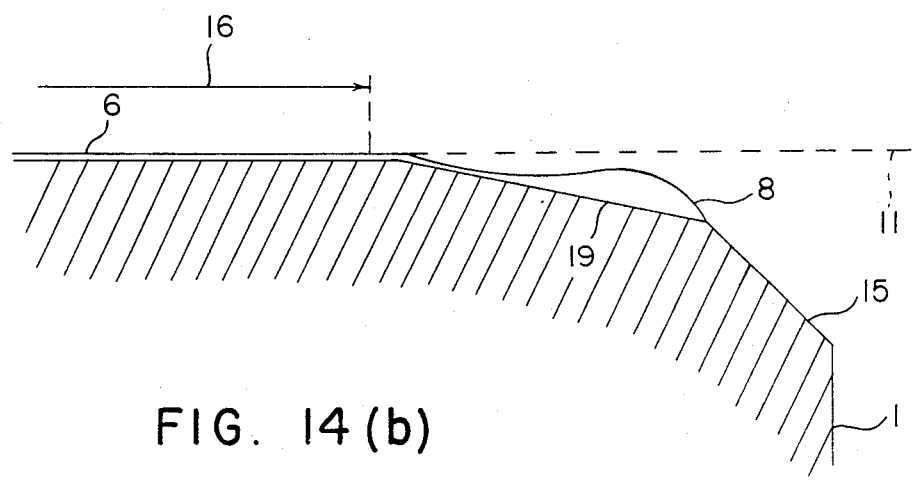
Figure 14C:
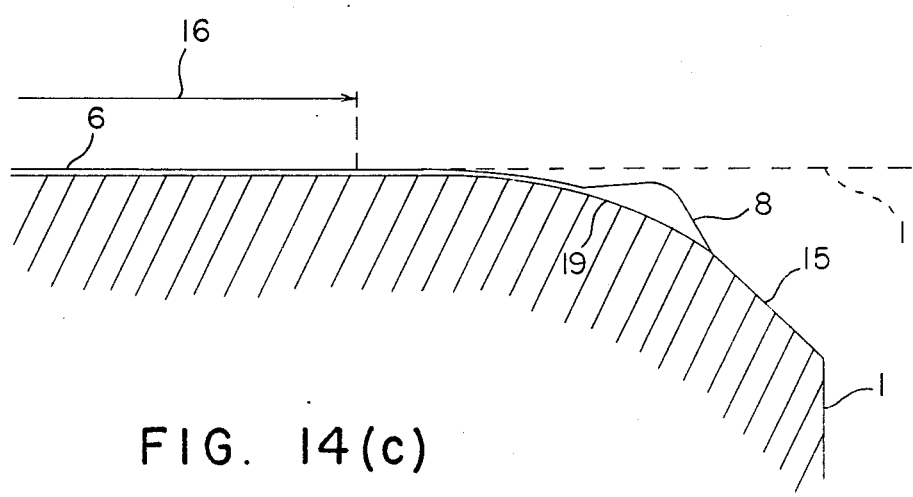

FIGS. 14 (a), 14 (b) and 14 (c) are sectional views of the glass disc substrates having the edges shown in FIGS. 13 (a), 13 (b) and 13 (c), respectively, on which a resist film is applied by the spin coat method. At the edge of the glass disc substrate, the resist film has a rise 8 due to the surface tension.

On the glass disc substrate of the conventional shape shown in FIG. 14 (a), the rise 8 of the resist film 6 is higher than the resist film surface plane 11. When placing the mask plate 7 on the glass substrate 1 in the manufacturing step II, under this condition, the mask plate 7 will be positioned on the plane 11', resulting in defective contact over a large area between the mask plate 7 and the resist film 6. On the glass disc substrate of the shape shown in FIGS. 14 (b) or 14 (c), in contrast, the rise 8 of the resist film 6 is lower than the resist film surface plane 11 so that the mask plate 7 can be positioned on the resist film surface plane 11. Consequently, sufficient contact can be obtained between the mask plate 7 and the resist film 6 over the area 16 with the guide grooves formed thereon.

As appreciated from the above, according to the present invention, the guide grooves formed in the optical memory element are entirely of proper shape, thus reducing noise in reproduced signals.

While only certain embodiments of the present invention have been described, it will be apparent to those skilled in the art that various changes and modifications may be made therein without departing from the spirit and scope of the present invention as claimed.

What is claimed is:

1. A method for manufacturing an optical memory element having guide tracks and address tracks for storing information, which comprises the steps of:
    applying a photo resist film onto a substrate which includes a center hole to form a coated substrate;
    preparing a photo mask plate by, forming a mask pattern on said mask plate, said mask pattern comprising a guide track pattern and address track pattern, and forming a position reference marker on said mask plate with reference to said mask pattern for positioning said mask plate;

placing said mask plate on said coated substrate so as to position said position reference marker with reference to said center hole of said coated substrate;

transcribing, from said mask plate, a latent image of said mask pattern onto said photo resist film;

developing said latent image on said photo resist film to form a developed photo resist film; and etching said substrate so as to form guide tracks and address tracks in said substrate in conformance with said mask pattern, whereby alignment between said center hole of said substrate and said tracks is improved.

2. The method of claim 1, wherein said substrate is disc shaped and wherein the shape of said position reference marker corresponds to the shape of said center hole in said substrate.

3. The method of claim 1, wherein said mask plate includes a peripheral mask portion and wherein a part of said peripheral mask portion is removed before said mask plate is placed on said photo resist film so as to receive any risen portion of said photo resist film that is of improper thickness whereby contact between said mask plate and said substrate is improved.

4. The method of claim 1, wherein said substrate includes a peripheral substrate portion and wherein said peripheral substrate portion is removed before said photo resist film is applied to said substrate so as to receive any risen portion of said photo resist film that is of improper thickness, whereby contact between said mask plate and said substrate is improved.

5. The method of claim 2, wherein said mask plate is prepared by forming a metallic mask film on said mask plate, and etching said mask film to form said mask pattern and said position reference marker means on said mask plate.

6. The method of claim 5, wherein said substrate comprises glass, said mask plate comprises quartz glass, and said metallic mask film comprises Cr, CrO, Ni, Ti, or Ta.

7. The method of claim 6, wherein said photo resist film is applied on said substrate with a spin coating method, said mask plate is placed on said photo resist film in an airtight manner, said mask pattern is transcribed onto said photo resist film by irradiating said mask plate with ultraviolet rays, and said substrate is etched by wet etching or dry etching in a $CF_4$ or $CHF_3$ gas atmosphere.

8. The method of claim 1, further comprising removing said developed photo resist film from said substrate and forming a recording medium layer on said substrate.

9. The method of claim 7, wherein said photo resist film has a thickness of from about 100 nm to 500 nm.

10. The method of claim 5, wherein said position reference marker means comprises a mark of a similar size as said center hole etched on said metallic mask film.

11. The method of claim 5, wherein said position reference marker comprises a plurality of marks of various sizes compared to said center hole etched on said metallic mask film.

12. The method of claim 3, wherein said peripheral mask portion is removed to form a mask groove corresponding to the outer peripheral edge of said photo resist film.

13. The method of claim 12, wherein said mask groove is formed to be square-shaped, tapered, or curved.

14. The method of claim 12, wherein said mask groove is formed with a depth of from about 0.2 to 0.5 mm.

15. The method of claim 4, wherein said peripheral substrate portion is removed by grinding said substrate to form an outer inclined substrate edge which declines from the tracks plane of the portion of said substrate adjacent to where said tracks are to be etched to below said tracks plane at the outer edge of said substrate.

16. The method of claim 15, wherein said outer edge of said substrate comprises a chamfered edge.

* * * * *